United States Patent
Tang (10) Patent No.: US 8,698,748 B2
(45) Date of Patent: Apr. 15, 2014

(54) ERGONOMIC ADAPTIVE MOUSE WITHOUT ORIENTATION LIMITATION

(75) Inventor: Sheng-Kai Tang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 499 days.

(21) Appl. No.: 12/773,612

(22) Filed: May 4, 2010

(65) Prior Publication Data

US 2010/0295787 A1  Nov. 25, 2010

(30) Foreign Application Priority Data

May 20, 2009 (TW) .............................. 98116638 A (51) Int. Cl.
*G06F 3/033* (2013.01)
(52) U.S. Cl.
USPC .......................................... 345/166; 345/163
(58) Field of Classification Search
USPC .................................. 345/156, 158, 163–166
See application file for complete search history.

(56) References Cited

U.S. PATENT DOCUMENTS

| | | | |
|---|---|---|---|
| 6,654,001 B1 * | 11/2003 | Su ................................ | 345/156 |
| 2001/0024192 A1 | 9/2001 | Lewis | |
| 2002/0093487 A1 * | 7/2002 | Rosenberg .................... | 345/166 |
| 2004/0046739 A1 * | 3/2004 | Gettemy ....................... | 345/158 |
| 2004/0227728 A1 * | 11/2004 | McAlindon ................... | 345/156 |
| 2007/0080945 A1 | 4/2007 | Huppi | |

FOREIGN PATENT DOCUMENTS

| | | |
|---|---|---|
| CN | 1845049 A | 10/2006 |
| CN | 201110997 Y | 9/2008 |
| CN | 201145888 Y | 11/2008 |
| CN | 101424986 A | 5/2009 |

* cited by examiner

*Primary Examiner* — Quan-Zhen Wang
*Assistant Examiner* — Tony Davis
(74) *Attorney, Agent, or Firm* — Muncy, Geissler, Olds & Lowe, P.C.

(57) ABSTRACT

An adaptive mouse is disclosed. In the adaptive mouse, a cover layer made of a moldable material covers a mouse body, and a plurality of sensors is disposed between the mouse body and the cover layer. The sensors are used to sense a hand shape of a user when the user holds the cover layer. The sensors under the left and right finger predicting areas are defined as a left button and a right buttons to allow the user to operate the mouse normally. Then, the displacement signal of the mouse is adjusted. The adaptive mouse may increase comfortableness and relieve fatigue, and it also may be adapted to any holding states without orientation limitation.

8 Claims, 7 Drawing Sheets

ERGONOMIC ADAPTIVE MOUSE WITHOUT ORIENTATION LIMITATION

BACKGROUND OF THE INVENTION

1. Field of the Invention

The invention relates to a mouse and, more particularly, to an adaptive mouse which meets the ergonomics demand and may be used without orientation limitation.

2. Description of the Related Art

Generally, to control a cursor of an electronic device such as a desktop computer or a notebook computer, the most convenient way is to use a mouse. Except for inputting words, the electronic device almost can be controlled and used via a single mouse. As the electronic products are developed to be reduced in size to facilitate the carrying, the mouse is manufactured to be smaller and smaller therewith. Once the size of the mouse is reduced, the holding part of the mouse also becomes smaller to be hard operated. It is difficult for the user to press buttons, control the cursor and even use the wheel to scroll. Thus, the mouse is not only hard to operate but also may make the user feel tired and even cause permanent occupational disease.

However, the problem that the mouse is hard to operate not only exists in the small mouse, but also exists in a general size mouse. Although the holding part of the general size mouse is big enough, after a long-term use, the user's hand also may be tired, and even the muscle of the hand is fibrotic due to long-term pressure, which is a serious problem cannot be ignored. Although there are mice which meet the ergonomics demand in the market, and special shapes of these mice may be designed to meet the comfortableness requirement of the user, the design may limit the using groups. For example, to the ergonomic mice designed for a right-handed person, a left-handed person cannot use it.

In another aspect, a neutral mouse is designed under the universal design principle. However, the neutral mouse is hard to meet the hand shapes of both the left hand and right hand, and it needs an additional manual setting in advance when another user who gets used to using the other hand uses the mouse. Furthermore, using the mouse depends on the visual sense highly in the beginning. In special environment such as at a meeting in the dark or in the emergency, it is hard to hold the mouse correctly without enough visual sense.

BRIEF SUMMARY OF THE INVENTION

An adaptive mouse disclosed in the invention includes a mouse body, a cover layer and a plurality of sensors. A displacement sensing module and a microprocessor unit are disposed inside the mouse body. The displacement sensing module detects displacement of the mouse body, and the displacement is transformed to a displacement signal via the microprocessor unit to control the position of a cursor in a connected electronic device. The cover layer is made of a moldable material and covers the mouse body, and it may be deformed according to a hand shape of the user when the user holds the cover layer. The sensors are disposed between the cover layer and the mouse body. When the user holds the cover layer and makes it deformed, the sensors sense the deformation of the cover layer and determine a holding state of the user according to the deformation. Furthermore, the sensors under the left and right finger predicting areas are defined as input buttons (such as left and right buttons) to allow the user to operate the mouse normally.

Thus, the cover layer made of the moldable material may be deformed along with the holding of the user and attached to the user's hand, and no matter in which hand of the user is the mouse held, the comfortableness requirement is met. The sensors sense the hand shape of the user, select the sensors corresponding to the position of the hand shape of the user and define corresponding input buttons. The user does not need to define the input buttons him or herself, and even in dark environment or in emergency condition, he or she may use the mouse without the orientation limitation.

In another aspect, a magnetic layer is disposed outside the mouse body, and the sensors are selected to be Hall sensors. The cover layer is deformed when the user holds it, and the corresponding positions and distances of the cover layer relative to the magnetic layer are changed, and thus the magnetic field is changed. The Hall sensors may sense the change of the magnetic field, and the hand shape of the user may be determined, and the positions of the input buttons are defined.

These and other features, aspects and advantages of the present invention will become better understood with regard to the following description, appended claims, and accompanying drawings.

DETAILED DESCRIPTION OF THE EMBODIMENTS

The invention provides an adaptive mouse to provide an ergonomic mouse which meets the left and right hands holding state. Input buttons (including a left button, a right button, a wheel and so on) thereof may be defined automatically without being set in advance by the user. Thus, the user is not only allowed to hold and use the adaptive mouse in normal condition at any time, but also allowed to use it in dark environment or in emergency condition without visual sense assistance.

Figure 1A:
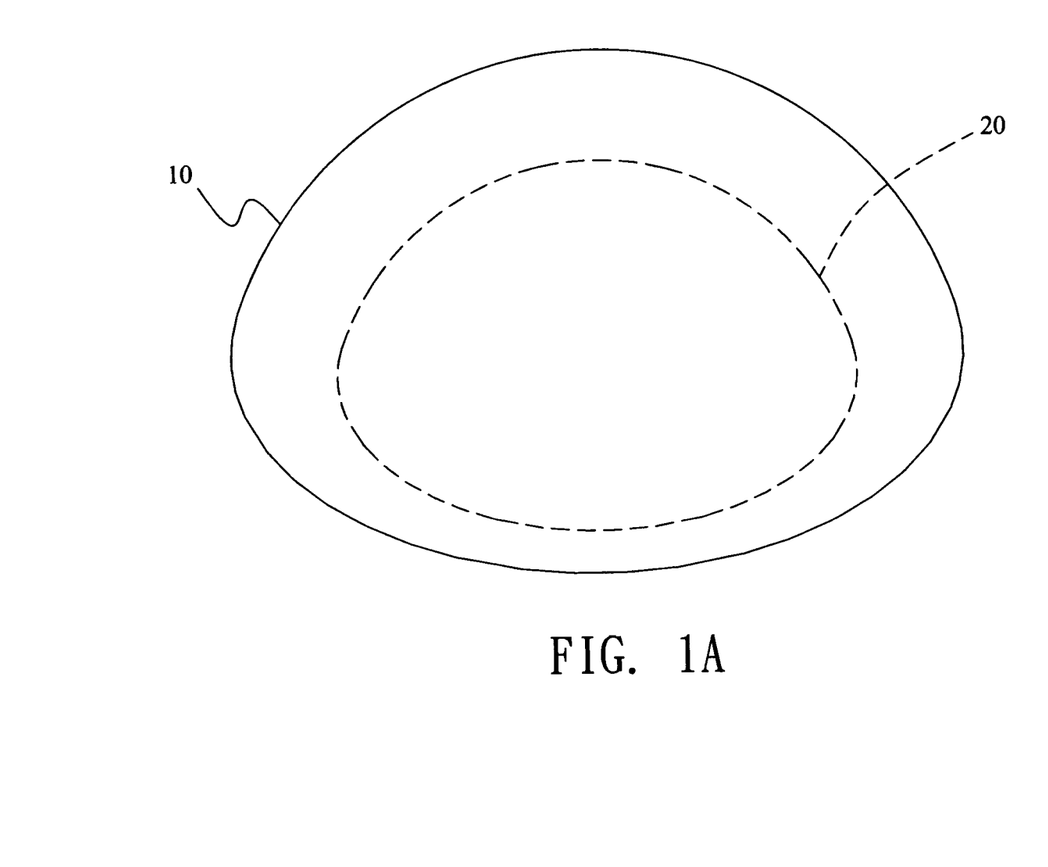
FIG. 1A and FIG. 1B are schematic diagrams showing the adaptive mouse in a first embodiment of the invention.
Figure 1B:
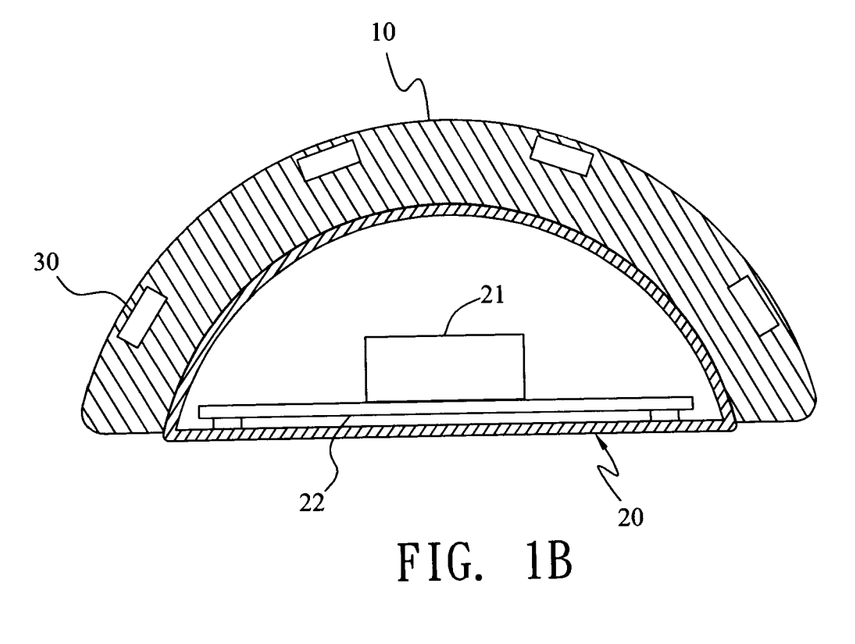

FIG. 1A and FIG. 1B are schematic diagrams showing the adaptive mouse in a first embodiment of the invention. The adaptive mouse includes a mouse body 20, a cover layer 10 and a plurality of sensors 30. The mouse body 20 includes a displacement sensing module 21 and a circuit board 22 inside. The circuit board 22 may allow electronic elements and integrated circuits such as a microprocessor unit to be disposed. An optical sensing module is the most common displacement sensing module 21, and it may sense the displacement and the direction of the mouse body 20 via optical reflection. Then, the microprocessor unit is used to calculate and transform the displacement and direction information to displacement signals and output them to the connected electronic device to control the cursor of the electronic device. The adaptive mouse is preferred to be wirelessly connected to the electronic device (not shown).

The cover layer 10 is made of a moldable material and coves the mouse body 20. The cover layer 10 is hemispherical and includes a certain thickness to be suitable for holding.

Thus, the cover layer 10 may be deformed according to the hand shape and a holding force of the user, and it also may well attach to different user's hands to meet the comfortableness demand and relieve the fatigue after a long-term use. The sensors 30 are disposed between the cover layer 10 and the mouse body 20, and as shown in FIG. 1A and FIG. 1B, the sensors 30 are embedded in the cover layer 10. The user holds the cover layer 10 to make it deform, and the sensors are driven to detect the hand shape and state of the user. The sensors 30 is used to sense deformation of the cover layer 10 to define a signal detected by one of the sensors 30 as an input button signal. For example, the sensors 30 under the left and right finger predicting areas are used as input buttons signals.

Thus, from the whole appearance, the adaptive mouse includes no buttons and wheels disposed like that in the conventional mouse. The buttons and wheels may be defined according to the holding state after the adaptive mouse is held by the user. Thus, the adaptive mouse provides no orientation limitation, and it can be used without being set in advance by the user. The sensors 30 may sense the stretch, the bend and the compression of the deformed cover layer 10, and they also may sense the change of the stress, the electricity, the magnetic field and so on which are generated via the deformation.

Figure 2:
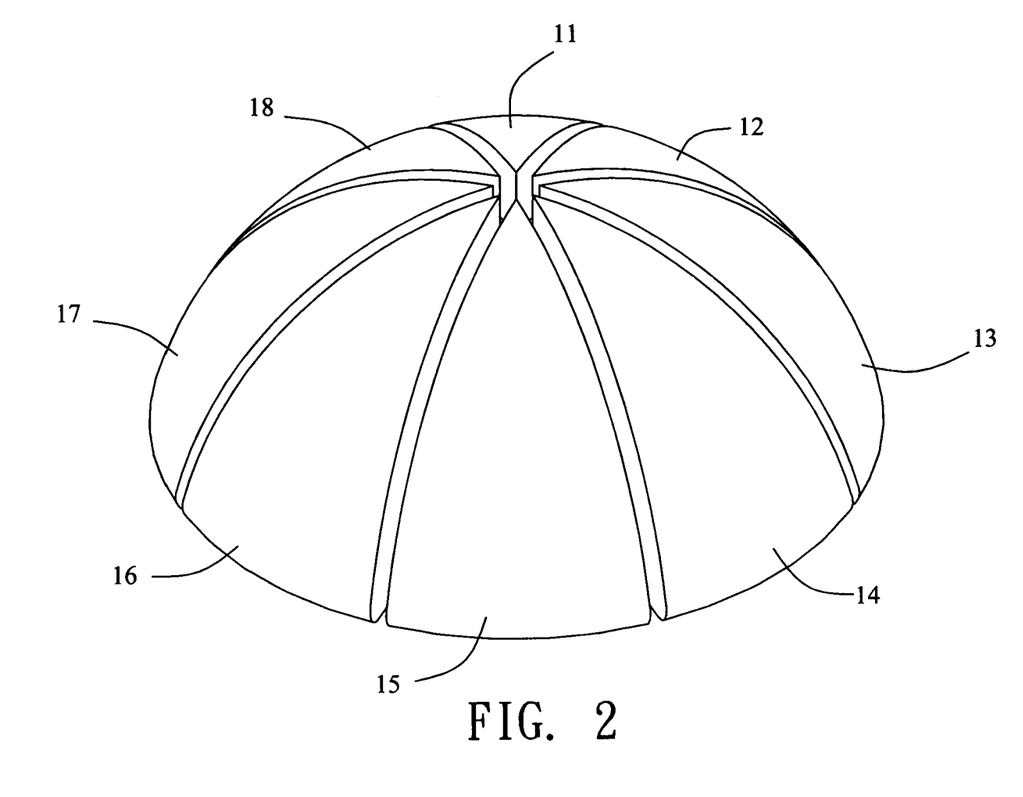
FIG. 2 is a schematic diagram showing the adaptive mouse in a second embodiment of the invention.
Figure 3:
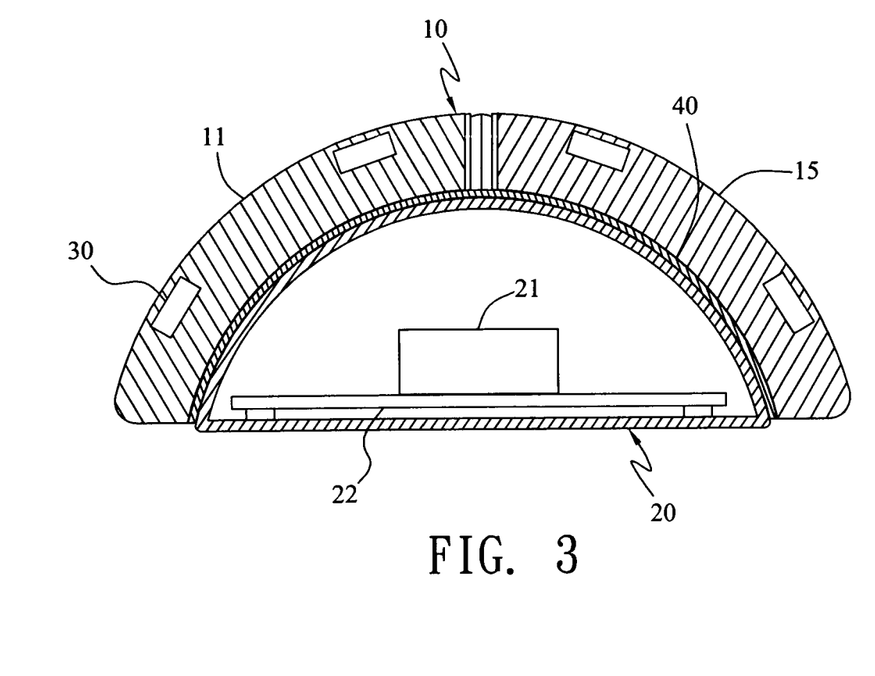
FIG. 3 is a sectional diagram showing the adaptive mouse in the second embodiment of the invention.

FIG. 2 and FIG. 3 are schematic diagrams showing the adaptive mouse in a second embodiment of the invention. Besides the hemispherical cover layer 10, to prevent the sensors 30 from interfering with each other and to facilitate illustration of the setting of the input buttons, the cover layer 10 in the embodiment is divided into a first part 11, a second part 12, a third part 13, a fourth part 14, a fifth part 15, a sixth part 16, a seventh part 17 and the eighth part 18. Each part includes two corresponding sensors. The more sensors there are, the more accurate the hand shape of the user may be predetermined However, the cost is relatively high.

Figure 4:
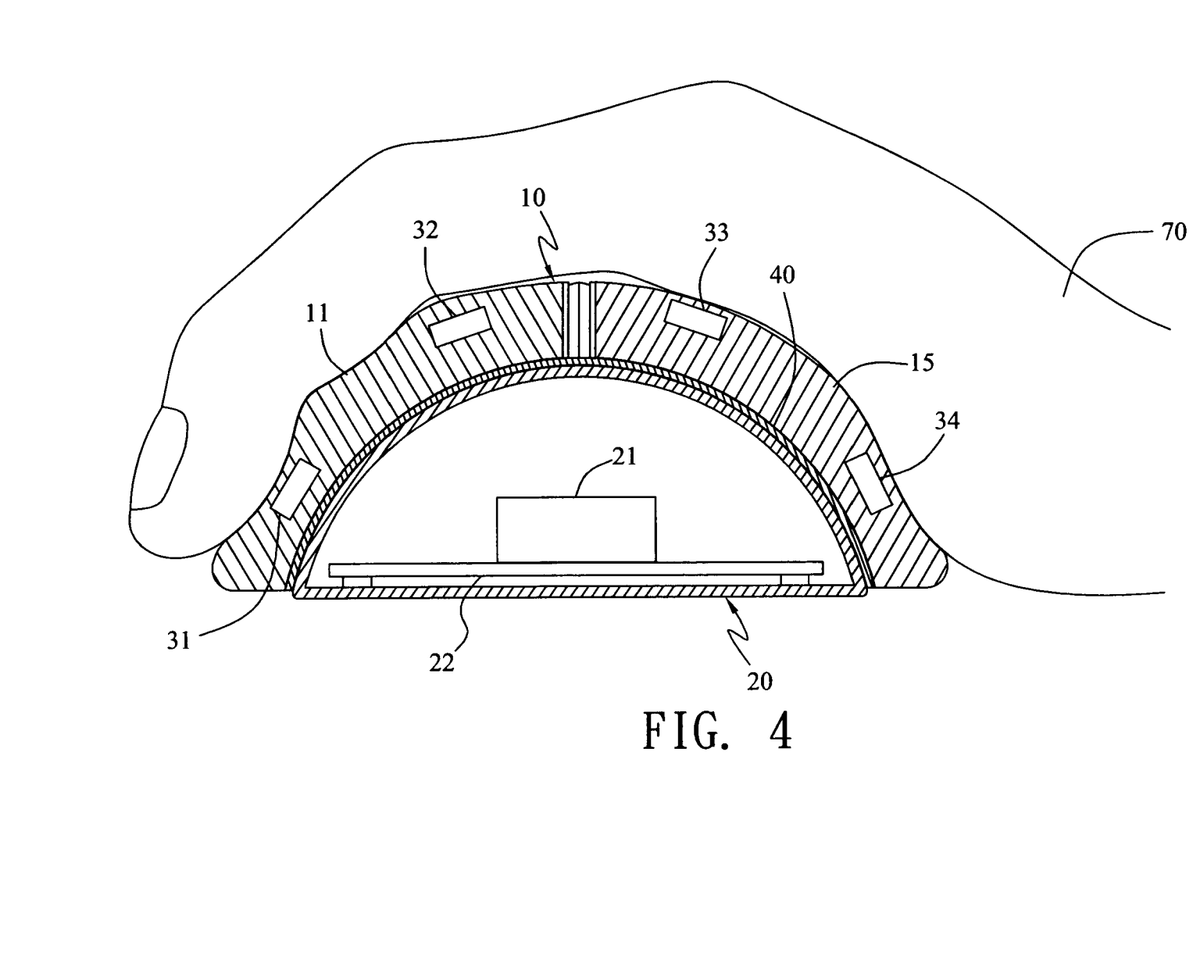
FIG. 4 is a sectional diagram showing the deformation of the cover layer of the adaptive mouse due to pressure in the second embodiment of the invention.

As shown in FIG. 4, in the second embodiment, the sensors 30 are Hall sensors, and the mouse body 20 includes a magnetic layer 40 outside. When the cover layer 10 is deformed due to the pressure of the user's hand 70, the distances between the sensors 30 and the magnetic layer 40 are changed, and then the magnetic field is changed. Thus, the hand shape of the user may be detected via the change of the magnetic field detected by the Hall sensors 30.

As shown in FIG. 4, when the user's hand holds the cover layer 10 to make it deform, the first sensor 31 and the fourth sensor 34 are pressed by the user's finger and a part near the wrist to be deformed. The second sensor 32 and the third sensor 33 generate almost no deformation. Since the pressing forces applied by the finger and the part near the wrist and the deformation levels are not the same, the hand shape and direction may be further determined. The determination and calculation may be performed by the microprocessor unit disposed on the circuit board 22, and the microprocessor unit 22 also includes learning and memory functions to determine quickly according to the shape of the user's hand 70.

Figure 5A:
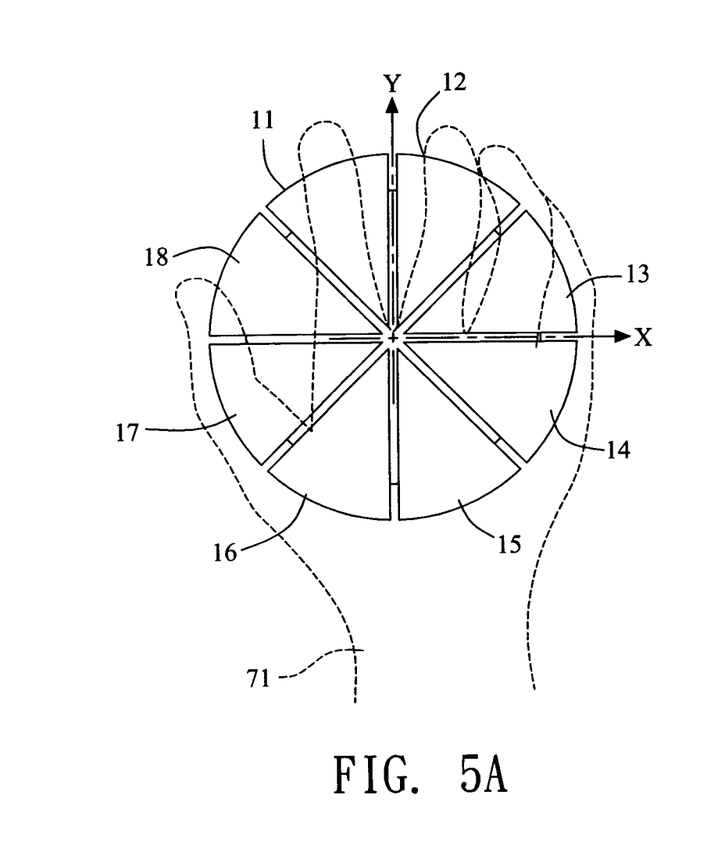
FIG. 5A to FIG. 5C are schematic diagrams showing the using aspect of the adapted mouse in an embodiment of the invention.

In actual application, as shown in FIG. 5A, when the user holds the adaptive mouse with a right hand 71, it is detected and determined that the user uses the right hand 71 to hold the adaptive mouse in the above mode. Then, the sensors 30 at the first part 11 of the cover layer 10 are defined as the left button, and the sensors 30 at the second part 12 are defined as the right button. Furthermore, functions of the wheel may be defined to be performed when two sensors 30 at the first part 11 are triggered sequentially (as shown in FIG. 3). Other input buttons also may be defined additionally to make the adaptive mouse include expanded functions.

Figure 5B:
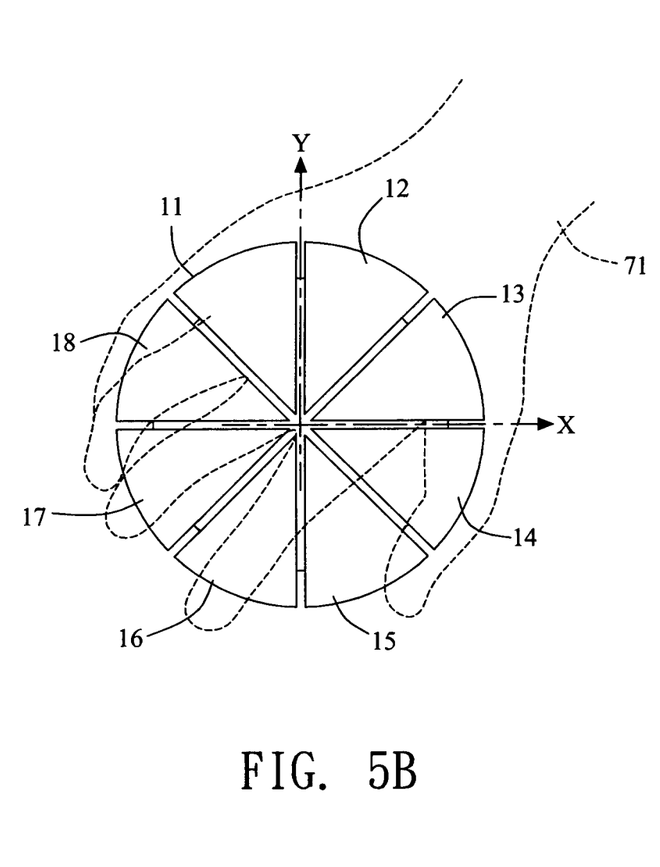
Figure 5C:
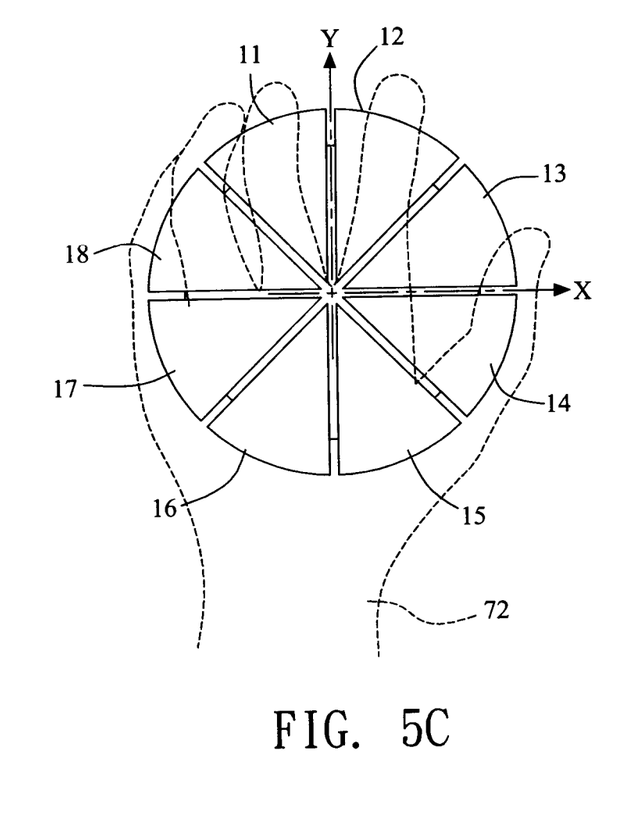

When the user's right hand 71 leaves the adaptive mouse, the above setting may be cleared. As shown in FIG. 5B, when the user holds the adaptive mouse with the right hand 71 again, the user holds it slantwise, and the sensors 30 may determine the holding direction and position of the right hand 71 via the deformation of the cover layer 10 and further defines the sensors 30 at the sixth part 16 of the cover layer 10 to be the left button, and the sensors 30 at the seventh part 17 to be the right button. Since the holding direction is changed, the direction changing value may be fed back to the displacement sensing module 21 to rotate the moving direction by 135 degrees towards left to cooperate with the holding direction of the user at that moment. Similarly, as shown in FIG. 5C, when the user holds the adaptive mouse with a left hand 72, since the deforming state of the cover layer 10 is different from that of the right hand 71 (as shown in FIG. 5A), the sensors 30 at the first part 11 of the cover layer 10 are defined as the right button, and the sensors 30 at the second part are defined as the left button.

Thus, in the adaptive mouse disclosed in the invention, the cover layer made of the moldable material covers the mouse body, and it may be deformed according to the holding state of the user to meet the comfortableness. In addition, the deformation of the cover layer is detected via the sensors, and the holding state of the user may be determined. The sensors under the left and right finger predicting areas are used as left and right buttons without being set in advance, and the adaptive mouse also may be used in the dark environment or in emergency condition.

Although the present invention has been described in considerable detail with reference to certain preferred embodiments thereof, the disclosure is not for limiting the scope of the invention. Persons having ordinary skill in the art may make various modifications and changes without departing from the scope of the invention.

Therefore, the scope of the appended claims should not be limited to the description of the preferred embodiments described above.

What is claimed is:

1. An adaptive mouse comprising:
   a mouse body;
   a cover layer made of a moldable material and covering a surface of the mouse body, the cover layer being divided into a plurality of circularly distributed sensing parts, and deformed by holding of a user and contacting the user's hand when held by the user without orientation limitation; and
   a plurality of sensors, disposed between said circularly distributed sensing parts of the cover layer and the mouse body, for sensing deformation of the cover layer when held by the user to define a holding state of the user, and further define a signal detected by one of the circularly distributed sensing parts as an input button signal according to the holding state of the user;
   wherein the holding state includes a holding direction and a holding position, and is defined by the hand shape of the user according to said deformation of the cover layer sensed by the sensors.

2. The adaptive mouse according to claim 1, wherein the sensors are Hall sensors.

3. The adaptive mouse according to claim 2, wherein a magnetic layer is disposed outside the mouse body and used for allowing the Hall sensors to sense the deformation of the cover layer.

4. The adaptive mouse according to claim 3, wherein when the cover layer is deformed, relative distances between the Hall sensors and the magnetic layer are changed, and the change of a magnetic field is sensed by the Hall sensors.

5. The adaptive mouse according to claim 1, wherein the input button signal is from a left button signal, a right button signal or a wheel signal.

6. The adaptive mouse according to claim 1, wherein the mouse body has a displacement sensing module and a microprocessor unit, the displacement sensing module detects displacement of the mouse body, and the displacement is transformed to be a displacement signal by the microprocessor unit.

7. The adaptive mouse according to claim 6, wherein the microprocessor unit adjusts the displacement sensing module according to the deformation of the cover layer sensed by the sensors.

8. The adaptive mouse of claim 1, wherein the plurality of sensors are disposed between a single cover layer and the mouse body.

* * * * *